United States Patent [19]

Bassi

[11] 4,366,982

[45] Jan. 4, 1983

[54] ADJUSTABLE POSITIONER FOR RECLINING SEAT BACKS

[75] Inventor: Alberto Bassi, Turin, Italy

[73] Assignee: ITW Fastex Italia S.p.A., Turin, Italy

[21] Appl. No.: 104,927

[22] Filed: Dec. 18, 1979

[30] Foreign Application Priority Data

Dec. 20, 1978 [IT] Italy ............................... 31035 A/78
Jun. 22, 1979 [IT] Italy ............................... 23802 A/79

[51] Int. Cl.³ ............................................ A47C 1/024
[52] U.S. Cl. .................................... 297/362; 297/361
[58] Field of Search ............... 297/361, 362, 354, 355, 297/366, 367, 379; 16/143, 139

[56] References Cited

U.S. PATENT DOCUMENTS 4,063,776 12/1977 Wahlmann et al. ............. 297/362 X
4,260,190 4/1981 Holloway et al. ................. 297/361

FOREIGN PATENT DOCUMENTS

2121880 11/1971 Fed. Rep. of Germany ...... 297/361
2222328 11/1973 Fed. Rep. of Germany ...... 297/361

Primary Examiner—William E. Lyddane
Attorney, Agent, or Firm—Jerold M. Forsberg; Thomas W. Buckman; Jack R. Halvorsen

[57] ABSTRACT

This invention discloses a device for setting the position of reclining seat backs of vehicles comprises a stationary bracket connected to the seat and a movable bracket connected to the seat back and pivoted to said stationary bracket. The stationary bracket includes a slideway provided in the stationary bracket, a slider adapted to slide along said slideway, an actuating means fastened to the usual control knob and means for engagement of said slider with said movable bracket. The engagement means are arranged at a location offset with respect to the pivotal axis of said movable bracket so as to provide a crank arm capable of angularly moving said movable bracket.

8 Claims, 22 Drawing Figures

ADJUSTABLE POSITIONER FOR RECLINING SEAT BACKS

The present invention relates to devices for setting the position of reclining seat backs of vehicles, particularly automative vehicles.

Devices for setting the position of reclining seat backs of automotive vehicles are already known in several embodiments. One of the most important devices of this kind from both the cost and functionality standpoint consists of two brackets one of which is secured to the seat back and the other to the seat, said brackets being provided with two gears having a different diameter and being obtained by means of a semiblanking operation. These gears mesh together and an excenter shaft driven by control knob causes a relative movement of the two gears with a resultant increase or decrease in the angle between the two brackets.

However, this device is relatively expensive because of the semiblanking operation required for obtaining the two gears and requires in addition such a gearing down between the two gears that, in order to obtain a 90° reclination of the seat back, more than one turn of the control knob is required.

It is an object of the present invention to provide a device which achieves the purpose for which it is intended to with relatively low manufacturing costs and also will obtain a 90° setting of the seat back by means of a single turn of the control knob. In addition, the device according to the invention offers the possibility of being interchangeable with known devices.

More particularly, this device is for setting the position of reclining seat backs of vehicles where they are, of the kind comprising a stationary bracket connected to the seat and a movable bracket connected to the seat back which is pivotally attached to said stationary bracket. The device is characterized, according to the invention, in that said device comprises a slideway provided in said stationary bracket, at least a slider adapted to slide along said slideway, an actuating means fastened to the usual control knob and intended to convert the rotational motion of said control knob into a rectilinear motion of said slider, and means for engagement of said slider with said movable bracket. Said engagement means being arranged at a location offset with respect to the pivotal axis of said movable bracket so as to provide a crankarm capable of angularly moving said movable bracket.

According to one feature of the present invention, the stationary bracket is L-shaped and has a leg intended to be fastened to said seat and another leg substantially at right angles to said first leg in which said slideway is provided.

According to another feature of the present invention, the actuating means secured to the control knob consists of a disc having a spiral track on a face thereof and the slider is provided with an element adapted to engage said spiral track.

According to still another feature of the invention, the means for engagement of the slider with the movable bracket consist of a slot in the slider and a pin secured to the movable bracket and intended to slide in said slot.

The device according to the invention can be further improved by converting, where possible, the sliding friction into rolling friction and reducing the effort for its control.

Therefore, according to a further feature of the present invention, there are provided two sliders, arranged on opposite sides of said slideway and the usual control knob is connected to the actuating means through outer toothings provided both on said control knob and said actuating means, the toothing on said control knob having a teeth number much lower than that on the driving means in order to obtain a strong reduction of the operating forces.

According to another feature of the present invention, the actuating means has a disc having on a face thereof a semicylindrical narrow spiral groove and the two sliders each have an element adapted to engage said spiral groove through the interposition of a ball.

According to another feature of the invention, the means for engagement of the sliders with the movable bracket consists of a pin carried by the slider and a pair of radially extending slots provided in the movable bracket and adapted to receive the pin of the associated slider.

According to still another feature of the invention, the stationary bracket has in its slideway two slots provided on each side thereof and offset in height to each other and the sliders each have each a pin of a lesser length than the pin adapted to engage the radial slots of the movable bracket, the two pins of each slider being adapted to be received in the slots of the slideway of the stationary bracket in order to guide the movement of the sliders in the slideway.

The invention will be better understood from the following detailed description of preferred embodiments thereof, given merely by way of example, and therefore in no limiting sense, referring to the accompanying drawings, in which.

Referring now to the drawings, it is seen that the device for setting the position of reclining seat backs of vehicles, referred to generally as 10, comprises a stationary bracket 11, a movable bracket 12, a slider 13 and a driving disc 14.

Figure 6:
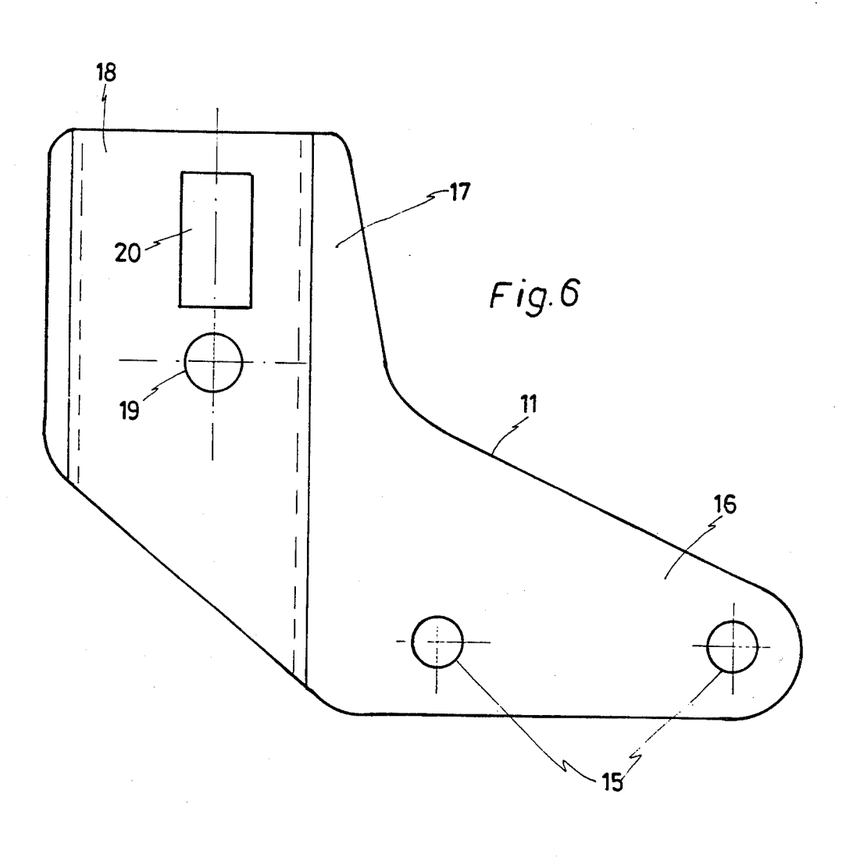
FIG. 6 is an elevational view of the stationary bracket of the device of FIG. 1.
Figure 6A:
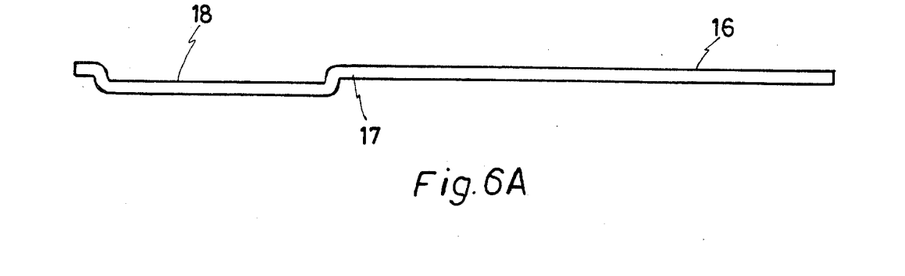
FIG. 6A is a top plan view of the stationary bracket of FIG. 6.

The stationary bracker 11 is intended to be secured to the seat (not shown). As is better seen in FIG. 6, the fixed bracket is generally L-shaped and has a horizontal leg 16 provided with holes 15 for receiving usual fastening means to be secured to the seat and a vertical leg 17 in which a slideway 18 is obtained by forming a depression therein in the shape of a channel. A hole 19 is provided in the slideway 18 for receiving a pin on which the movable bracket 12 and the actuating disc 14 are pivotally mounted. A small rectangular window 20 is provided above the hole for the purpose to be explained hereinafter.

Figure 7:
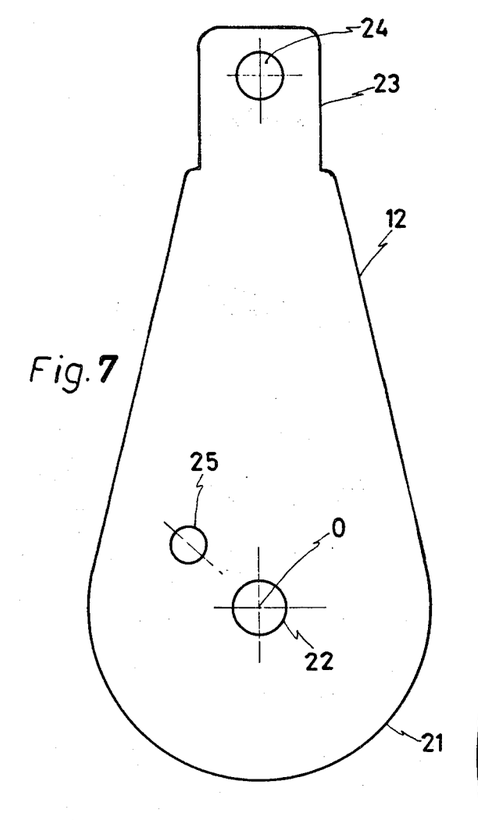
FIG. 7 is an elevational view of the movable bracket of the device of FIG. 1.

The movable bracket 12 (FIG. 7) has a semicircular bottom 21 at whose center a hole 22 is provided for receiving the pivot pin of the movable bracket. The movable bracket ends on the upper side with a rectangular portion 23 having a hole 24 for securing a fastening element to the seat back (not shown). At a location offset with respect to the pivotal axis O a projecting pin 25 is provided whose purpose will be explained hereinafter.

Figure 5:
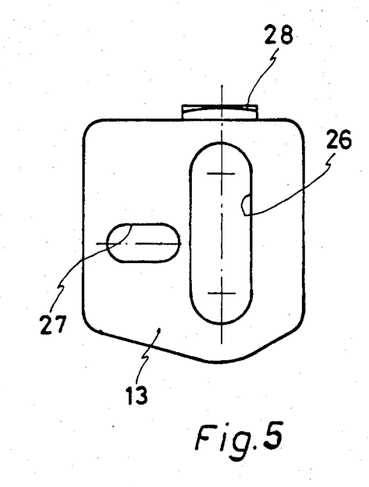
FIG. 5 is a front view of the slider of the device of FIG. 1.
Figure 5A:
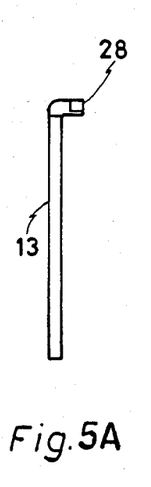
FIG. 5A is a slide elevational view of the slider shown in FIG. 5.

The slideway 18 of the stationary bracket 11 is intended to receive the slider (FIG. 5) which is in the form of a substantially rectangular plate and has a longitudinal slot 26 intended to slidably receive the pivot pin of the movable bracket 12 and a transverse slot 27 intended to receive the projecting pin 25 of the movable bracket 12. The slider 13 has on its upper side a raised and outwardly bent portion 28 intended to cooperate with the actuating disc 14, as will be seen hereinafter.

Figure 8:
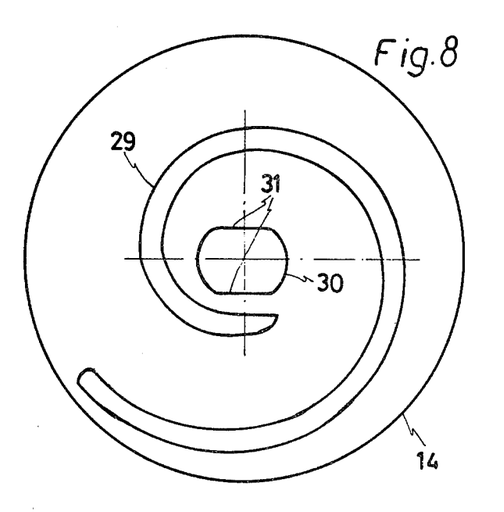
FIG. 8 is an elevational view of the driving disc of the device of FIG. 1.
Figure 8A:
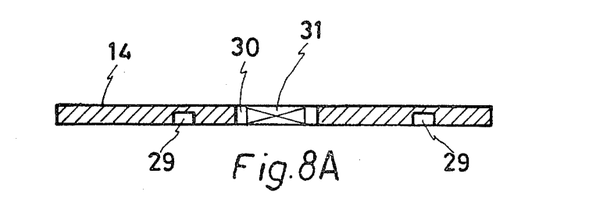
FIG. 8A is a diametral cross-sectional view of the driving disc of the device of FIG. 8.

The actuating disc 14 has on a face thereof a spiral groove 29 and at its center a hole 30 with two flats 31 for its pivotal connection coaxially to the axis O of the stationary bracket by means of a pin referred to generally as 32. The hole 30 of the disc 14, the hole 19 of the stationary bracket 11 and the hole 22 of the movable bracket 12 have decreasing diameters whereby the pin 32 has three sections of decreasing diameters corresponding to those of the above mentioned hole.

Figure 3:
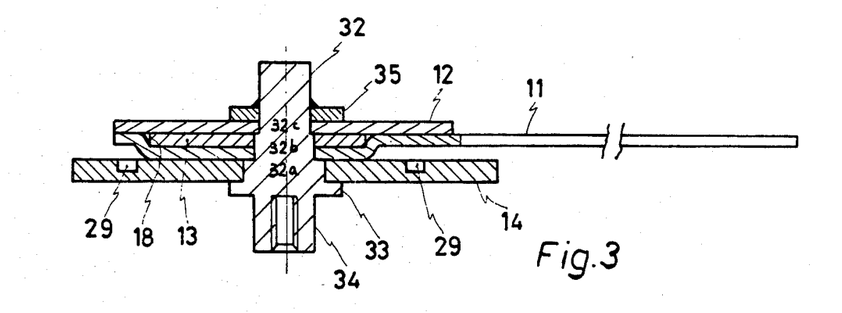
FIG. 3 is a cross-section of the embodiment of FIG. 1 taken along line 3—3 of FIG. 1.
Figure 4:
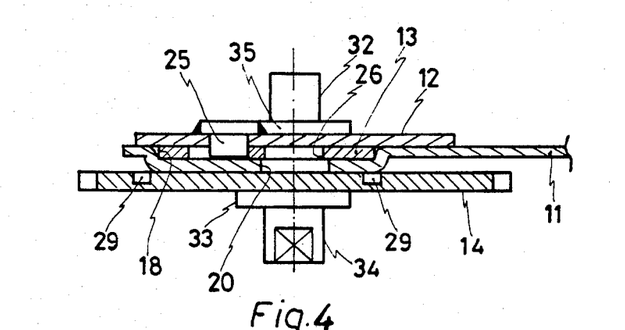
FIG. 4 is a cross-section of the embodiment of FIG. 1 taken along line 4—4 of FIG. 1.

The pin 32 has a flange 33 and extends outwardly by a section 34 intended to receive the control knob (not shown). As seen in FIG. 3 the pin 32 is stepped as at 32a, 32b, 32c and sized to be complementary to the holes of reducing diameters 30, 19 and 22.

Figure 2:
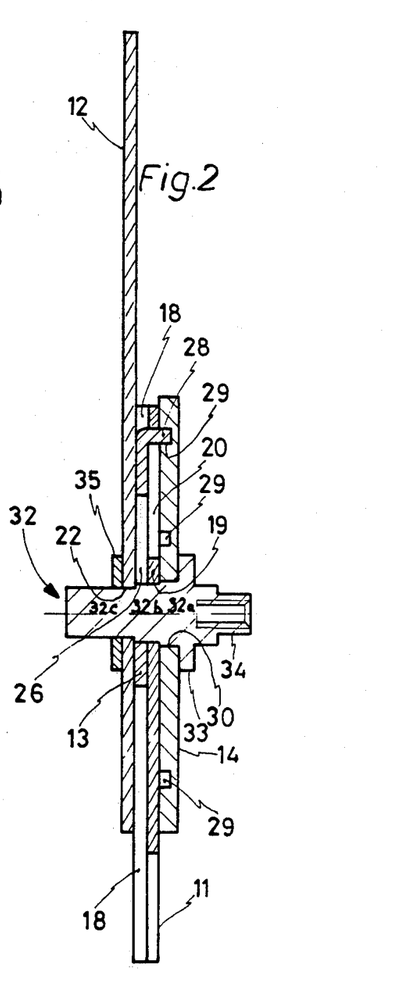
FIG. 2 is a cross-section of the embodiment of FIG. 1 taken along line 2—2 of FIG. 1.

The assembly of the device is effected as follows:

First, the pin 32 is inserted into the actuating disc 14 so that its smooth face abuts the flange 33 of the pin and the hole 30 receives the section 32a of the pin having a shape corresponding to that of the hole 30. In this way the disc 14 is keyed, due to the flats 31, on the pin for rotational movement therewith. The spiral groove 29 is therefore turned towards the inside of the device (or the left in FIG. 2). Then the stationary bracket 11 is inserted on the pin portion 32b. Since a certain tolerance is provided between the hole 19 of the stationary bracket 11 and the associated pin section 32b, the pin 32b can rotate freely. The so assembled stationary bracket 11 has a slideway 18 turned towards the inside of the device (on the left in FIG. 2). Then the slider 13 is inserted on the pin section 32b and more particularly so that the pin extends through the longitudinal slot 26 in the slider 13. Then the bent portion 28 of the slider is inserted in the groove 29 of the actuating disc 14 through the small window 20 of the stationary bracket 11. Thereafter, the movable bracket 12 is inserted on the pin section 32c having a smaller diameter. Here again, since a certain tolerance is provided between the hole 22 of the movable bracket 12 and the associated pin section 32c, the pin 32 can rotate freely. The sole element which remains secured to the pin 32 is thus the actuating disc 14. On assembling the movable bracket 12 on the pin 32 care should be taken that the pin 25 is inserted in the transverse slot 27 of the slider 13. Finally a washer 35 is welded to the pin 32 which thus keeps the device in assembled condition.

Figure 1:
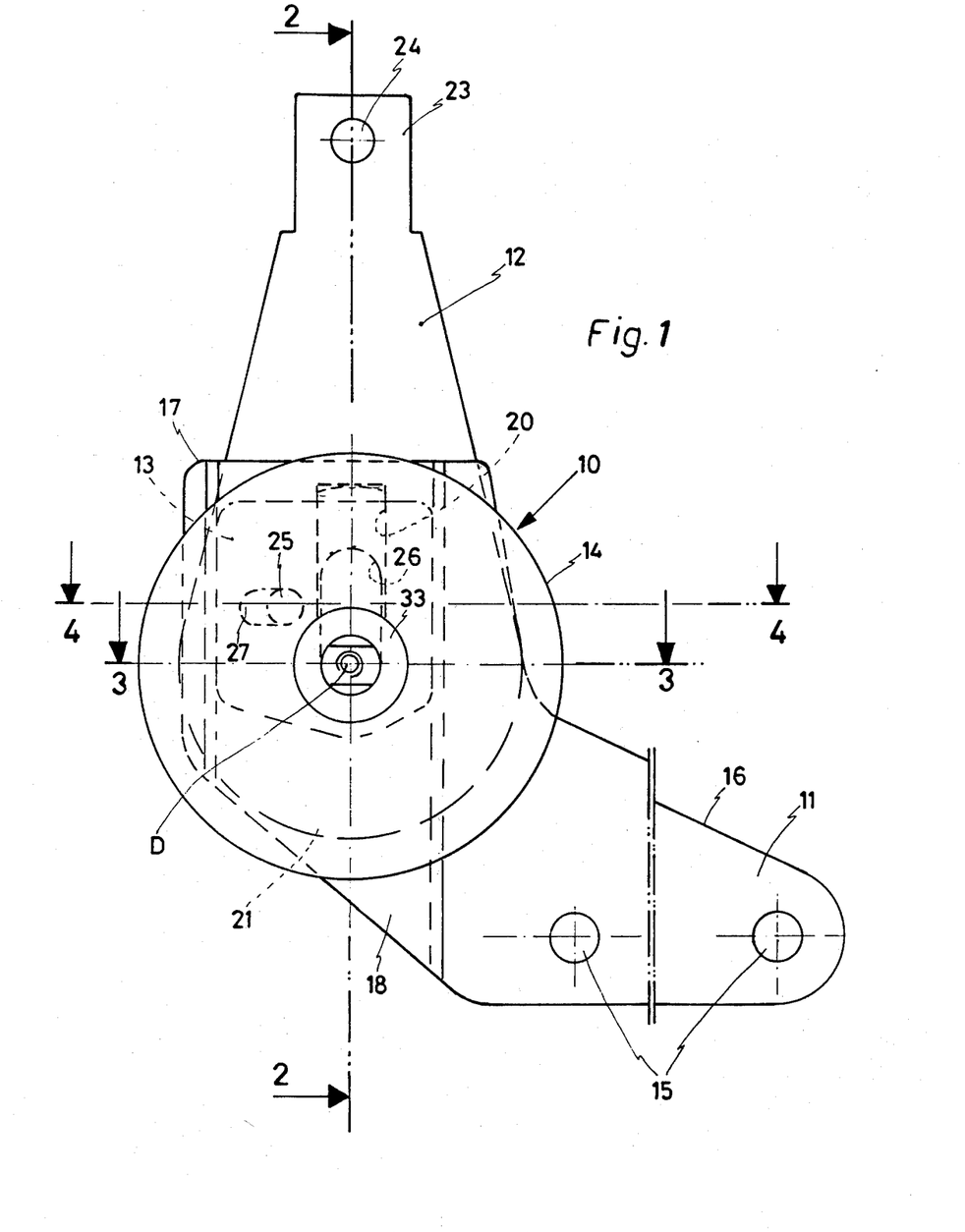
FIG. 1 is a side elevational view of the device for setting the position of reclining seat backs of vehicles according to an embodiment of the present invention.

The operation of the device is quite simple:

When the seat back is perpendicular to the seat, the movable bracket 12 is perpendicular to the leg 16 of the stationary bracket 11, the bent tip 28 of the slider 13 is at the outer end of the spiral groove 29 of the disc 14 and abuts the upper edge of the small window 20 of the stationary bracket 11, and the pin 25 of the movable bracket 12 is at the right end of the transverse slot 27 of the slider 13 (FIG. 1). By operating the control knob in a counterclockwise direction (FIG. 1) the bent tip 28 of the slider 13 is caused to follow the groove 29 of the disc 14 and since the spiral groove approaches the center of the disc 14, the disc 14 will be forced to go down the slideway 18 of the stationary bracket 11. This downward movement of the slider 13 will cause the edges of its transverse slot 27 to exert a downwardly directed force on the pin 25 of the movable bracket 12. A crank arm is thus provided between the pin 25 and the axis of rotation O of the system which causes an angular counterclockwise movement of the bracket 12 and therefore of the seat back associated thereto. Once a 45° back reclination has been reached, the pin 25 of the movable bracket 12 will abut the left edge (FIG. 1) of the transverse slot 27 of the slider 13.

By further rotating in a counterclockwise direction the control knob, the slider 13 will continue lowering until the upper edge of the longitudinal slot 26 will abut the pin 32 and the pin 25 of the movable bracket 12 will be again at the right end (FIG. 1) of the transverse slot 27 of the slider 13. In this position the seat back is reclined backwards by 90°. Obviously, any intermediate reclination could be obtained since if the control knob is released, the slider 13 will remain still because of the friction of the portion 28 in the groove 29. Since the spiral 25 extends over about 360° by means of but one turn of the disc 14, a reclination of the seat back by 90° will be obtained.

Summing up, there takes place first a conversion from a rotary to a rectilinear movement from the disc to the slider through the spiral groove and then a reconversion from a rectilinear to a rotary movement from the slider to the movable bracket through the crank gear.

Referring now to the drawings relating to the second embodiment of the invention, it is seen that the device for setting the position of reclining seat backs of vehicles, referred to generally as 100, comprises a stationary bracket 111, a movable bracket 112, two sliders 113 and an actuating disc 114.

Figure 14:
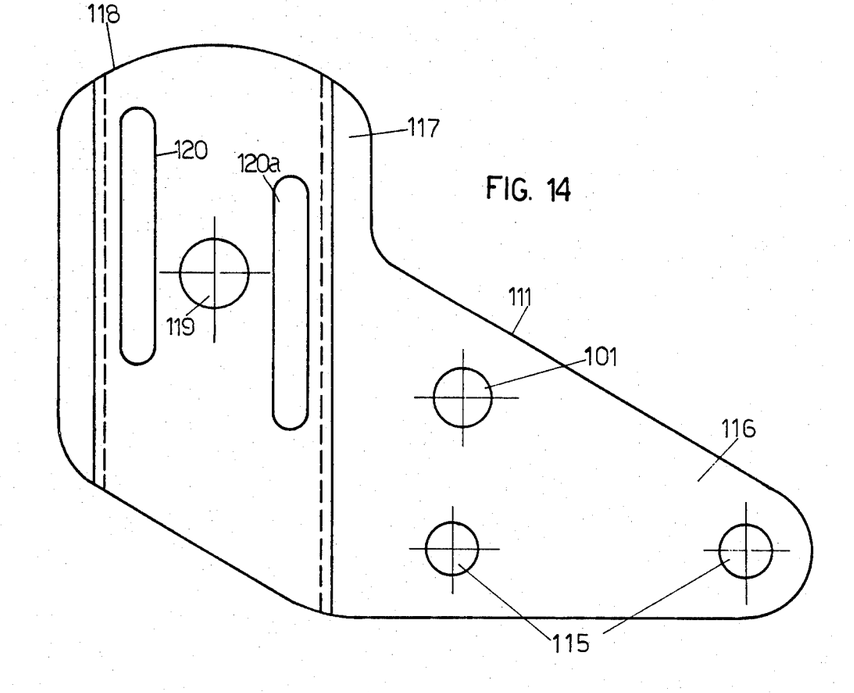
FIG. 14 is an elevational view of the stationary bracket of the device of FIG. 9.
Figure 14A:
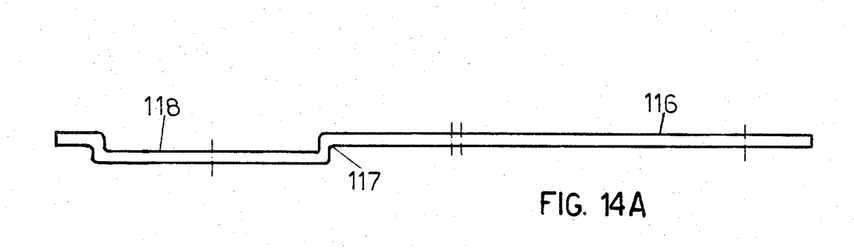
FIG. 14A is a top plan view of the stationary bracket of FIG. 14.

The stationary bracket 111 is intended to be secured to the seat (not shown). As is better seen in FIG. 14, the stationary bracket is generally L-shaped and has a horizontal leg 116 provided with holes 115 for receiving usual fastening means to be secured to the seat along its lower edge and a hole 101 intended to receive the control knob, and a vertical leg 117 in which a slideway 118 is obtained by forming in the form of a depression. A hole 119 is provided in the slideway 118 for receiving a pin on which the movable bracket 112 and the actuating disc 114 are pivotally mounted. On the sides of the hole, in the depression, there are provided two elongated slots 120 and 120a at positions mutually offset in height and more particularly the slot 120 at the higher position and the slot 120a at the lower position. The purpose of these slots will be explained hereinafter.

Figure 15:
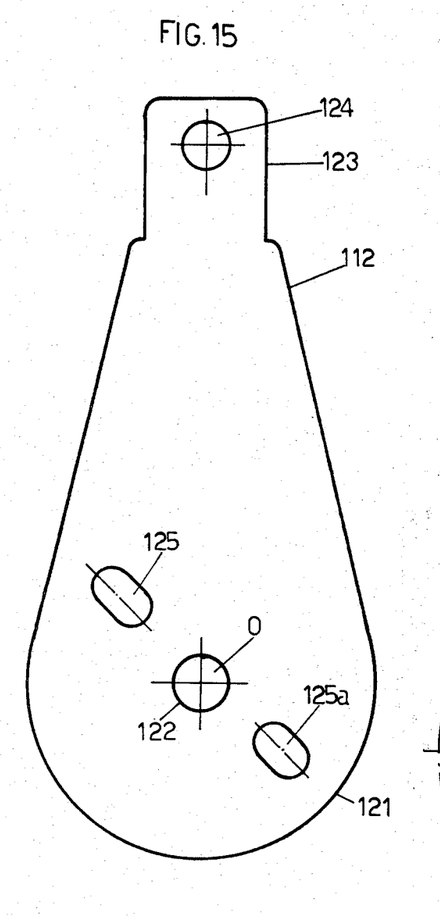
FIG. 15 is an elevational view of the movable bracket of the device of FIG. 9.

The movable bracket 112 (FIG. 15) has a semicircular bottom 121 at whose center a hole 122 is provided for receiving the pivot pin of the movable bracket. On the upper side the movable bracket ends with a rectangular portion 123 having a hole 124 adapted to receive a fastening element for the seat back (not shown). Provided at two opposite locations offset by 45° with respect to the axis of rotation O of the movable bracket are two short radial slots 125 and 125a whose purpose will be explained hereinafter.

Figure 10:
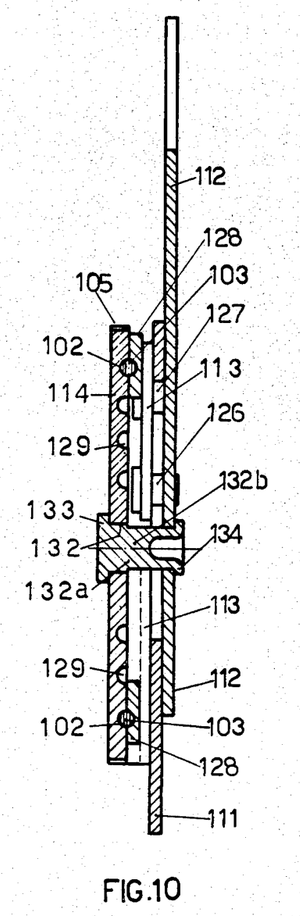
FIG. 10 is a cross-section of the embodiment of FIG. 9 taken along line 10—10 of FIG. 9.
Figure 12:
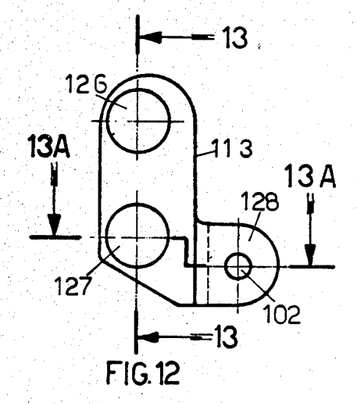
FIG. 12 is an elevational view of one of the sliders of the device of FIG. 9.
Figure 13:
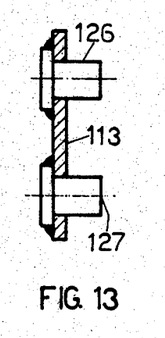
FIG. 13 is a cross-section of the slider of FIG. 12 taken along line 13—13 of FIG. 12.
Figure 13A:
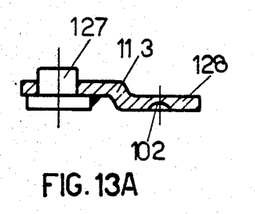
FIG. 13A is a cross-section of the slider of FIG. 12 taken along line 13A—13A of FIG. 12.

The slideway 118 of the stationary bracket 111 is intended to receive the two sliders 113 (FIGS. 12, 13 and 13A) which are in the form of a substantially L-shaped plate and have each a long pin 126 intended to slide in one of the slots 120 and 120a of the stationary bracket 111 and in one of the slots 125, 125a of the movable bracket, and a short pin 127 intended to slide in one of the slots 120 and 120A of the stationary bracket 11. Each end the slider 113 is provided with a portion projecting perpendicularly to the axis of the plate and offset with respect to it, which portion has a semispheric recess 102 intended to receive a ball 103 (FIG. 10), intended to cooperate with an actuating disc 114, as will be seen hereinafter.

Figure 16:
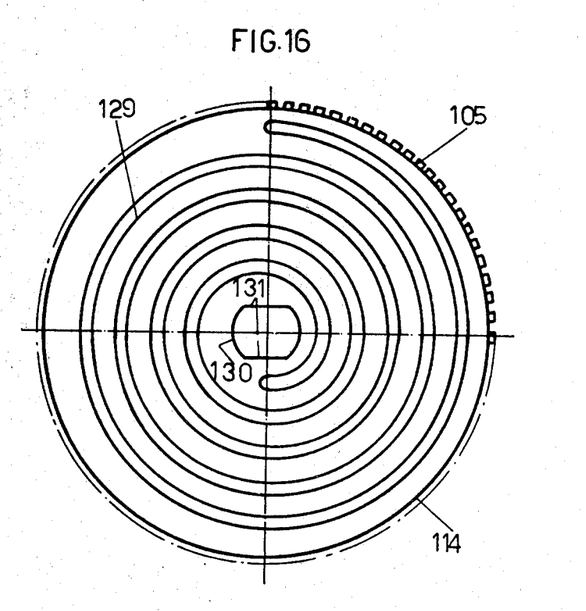
FIG. 16 is an elevational view of the driving disc of the device of FIG. 9.
Figure 16A:
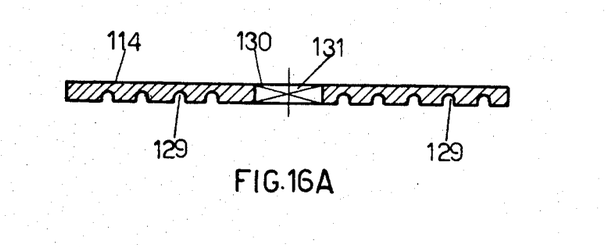
FIG. 16A is a diametral cross-sectional view of the driving disc of FIG. 16.

The actuating disc 114 has on a face thereof a semicylindrical spiral groove 129 and at its center a hole 130 with two flats 131 for its pivotal engagement coaxially to the axis O of the stationary bracket by means of a pin referred to generally as 132. The hole 130 of the disc 114 has a larger diameter than the hole 119 of the stationary bracket 111 and the hole 122 of the movable bracket 112 which have the same diameters whereby the pin 132 has two sections of decreasing diameter 132a, 132b, having a shape corresponding to that of the above mentioned holes. In addition, the actuating disc 114 has a toothing 105 on its periphery.

The pin 132 has at an end thereof a flange 133 intended to abut the actuating disc 114 and at its opposite end a flange 134 provided on the pin 132 during the assembling step so as to abut the movable bracket 112 to keep the whole assembly together.

Figure 11:
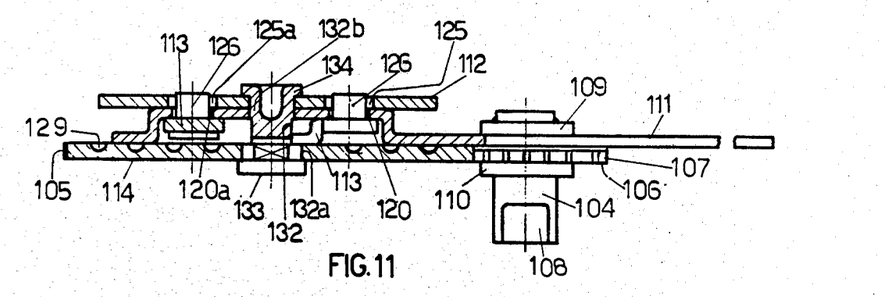
FIG. 11 is a cross-section of the embodiment of FIG. 9 taken along line 11—11 of FIG. 9.

Inserted into the hole 101 of the stationary bracket 111 is a pin 104 on which a gear 106 is keyed having a toothing meshing with the toothing 105 of the actuating disc 114. The pin 104 has an end provided with two flats 108 intended to receive the usual control knob (not shown) of the device and a flange 110 acting as an abutment. The other end of the pin 104 is secured to the stationary bracket 111 by means of a washer 109 welded to the pin 104.

The assembly of the device is effected as follows:

First, the actuating disc 114 is inserted on the pin 132 so that its smooth face abuts the flange 133 of the pin and the hole 130 receives the section 132a of the pin having a shape corresponding to that of the hole 130. In this way the disc 114 is keyed on the pin for rotational movement therewith. The semicylindrical spiral groove 129 is therefore turned towards the inside of the device (on the right in FIG. 10). Then the stationary bracket 111 is inserted on the pin section 132b and interposed between said bracket and the actuating disc 114 are the two sliders 113 with their pins 126 and 127 inserted into the slots 120 and 120a provided in the slideway 118 and more particularly the sliders are in inverted positions to each other, the sliders 113 sliding in the slot 120 having its L-shaped portion 128 on the upper side and the slider sliding in the slit 120a having its L-shaped portion 128 on the lower side. The so assembled stationary bracket 111 has a slideway turned towards the outside of the device (on the left in FIG. 10). Then a ball 103 is inserted into the semispheric seat 102 of the L-shaped portion of each slider 113 so that said ball engages with its projecting portion the groove 129 of the actuating disc 114. Thereafter the movable bracket 112 is inserted on the pin section 132b. Since a certain tolerance is provided between the hole 119 of the stationary bracket 111, the hole 122 of the movable bracket 112 and the pin section 132b, the pin 132 can rotate freely. The only element which remains secured to the pin 132 is thus the actuating disc 114. On assembling the movable bracket 112 on the pin 132 care should be taken that the long pins 126 of the sliders 113 are inserted into the radial slots 125 and 125a of the movable bracket 112. Finally, the pin 132 is secured and the flange 134 is formed by any suitable mechanical means which thus keeps the whole device assembled.

The pin 104 is now inserted in the hole 101 of the stationary bracket 111. Keyed on the pin 104 is the gear 106 which abuts thus on one side the flange 110 and on the other side the stationary bracket 111 with a certain clearance in order to enable it to rotate with the pin 104. The gear 106 has in this position its toothing 107 meshing with the toothing 105 of the actuating disc. The washer 109 is then mounted on the pin 104 behind the stationary bracket 111 and welded to the pin 104 so as to fasten the pin-gear assembly to the stationary bracket.

The operation of the device is quite simple.

Figure 9:
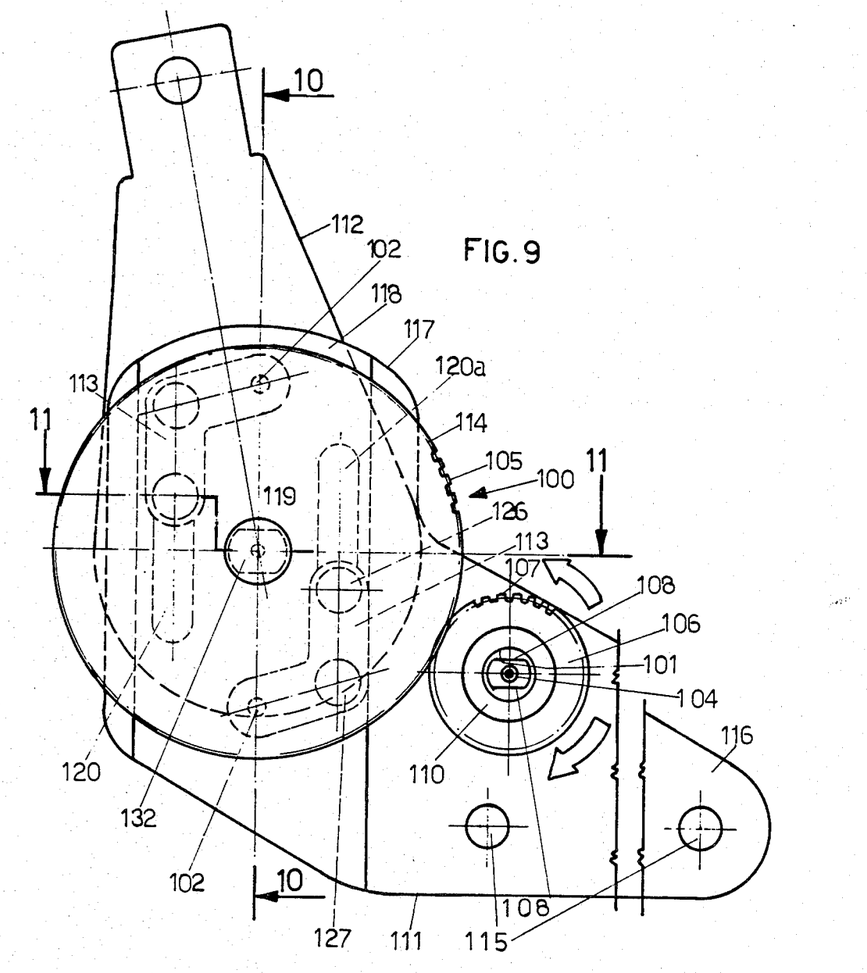
FIG. 9 is a side elevational view of the device for setting the position of reclining seat backs according to a second embodiment of the present invention.

When the seat back is perpendicular to the seat the movable bracket 112 is perpendicular to the leg 16 of the stationary bracket. The L-shaped portions 128 of the sliders 113 are at the outer end of the semicylindrical spiral groove 129 of the disc 114 through the interposition of the balls 103 which secure the sliders 113 to the disc 114. The pins 126 and 127 inserted into the slots 120 and 120a of the stationary bracket 111, and the long pins 126 of the slider 113 are also inserted into the radial slots 125 and 125a of the movable bracket 112 (FIG. 9). By operating the control knob in a counterclockwise direction (FIG. 9), the L-shaped portions 128 of the sliders 113 are forced to follow the spiral groove 129 of the disc 114 through the balls 103 and since the spiral groove 129 approaches the center of the disc 114 the left slider 113 will be forced to go down into its slot 120 and the right slider 113 will be forced to go up in its slot 120a of the stationary bracket 111. This downward movement of the left slider 113 and this upward movement of the right slider 113 will cause the pin 126 of the right slider 113 to exert an upward direction force on the radial slot 125a of the movable bracket 112. A crank arm is thus provided between the pins 126 and the axis of rotation O of the system which causes an angular counterclockwise movement of the movable bracket 112 and therefore of the seat back associated therewith. Once a 90° reclination has been reached, the pins 126 of the sliders 113 will abut the inner edge of the radial slots 125 and 125a of the movable bracket 112 and the pins 127 of the sliders will abut the upper and lower edges respectively of the slots 120a and 120. Obviously, any intermediate reclination could be obtained since if the control knob is released the sliders 113 will remain still.

Summing up, there takes place first a conversion from a rotary to a rectilinear movement from the disc 114 to the sliders through the spiral groove 129 and the balls 103 and then a reconversion from a rectilinear to a rotary movement from the sliders 113 to the movable bracket 112 by means of the engagement of the pins 126 of the sliders in the radial slots 125 and 125a of the movable bracket.

Obviously, it will be easily apparent that in this way the force required for actuating the device has been reduced insomuch as balls have been used to engage the actuating disc with the sliders, thus converting the sliding friction of the device according to the first embodiment into rolling friction and an engagement between the actuating disc and the control knob has been provided by means of meshing toothings, the toothing on the control knob having a teeth number somewhat lower than that of the toothing on the actuating disc, which provides a transmission ratio lower than unity whereby the force required for actuating the device is still further reduced.

While those embodiments of the present invention which are considered at present preferred have been illustrated and described, it is obvious that all changes falling within the scope of the appended claims can also be made.

What I claim is:

1. A device, particularly adapted for the adjustable setting of the position of a reclining seat back icluding a stationary bracket fixedly secured to a seat portion, a movable bracket fixedly secured to a seat back, and means for interconnecting said stationary and movable brackets; one of said stationary and movable brackets including a U-shaped slideway, the other of said stationary and movable brackets including a first portion of a crank arm means; said means for interconnecting including a slider adapted to be confined by and to slide rectilinearly along said slideway, an actuating means actuated by a control knob for transforming the rotational motion imparted to said control knob into a rectilinear motion of translation of said slider, and a pivot means; said slider including a second portion of said crank arm means, and a laterally projecting means for engagement by said actuating means; said crank arm means being arranged at a location offset with respect to the pivot means interconnecting said movable bracket and said stationary bracket so as to provide a crank arm capable of angularly moving said movable bracket and thereby said seat back upon rotational actuation of said control knob.

2. A device according to claim 10, wherein said stationary bracket is L-shaped and has a first leg intended to be fastened to said seat and second leg substantially at right angles to said first leg in which said slideway is provided.

3. A device according to claim 1, wherein said actuating means includes a disc having on a surface thereof a spiral groove and said laterally projecting means is adapted to engage said spiral groove.

4. A device according to claim 1, wherein said second portion of said crank arm means includes a second slot means provided in said slider and said first portion includes a pin fastened to said movable bracket, said pin adapted to slide within said second slot means.

5. A device as claimed in claim 1, wherein there are provided two sliders arranged on opposite sides of said slideway and said control knob is connected to said actuating means through outer toothings provided on both said control knob and said actuating means, said control knob having a lesser tooth number than that provided on said actuating means in order to obtain a strong reduction of the operating forces.

6. A device as claimed in claim 5, wherein said actuating means is a disc having on a surface thereof a spiral groove and each of said two sliders has a laterally projecting means adapted to engage said spiral groove, said laterally projecting means being generally ball shaped.

7. A device according to claim 5, wherein said second portion of said crank arm means includes at least one pin on each said slider and said first portion includes a pair of radially extending slots in said movable bracket, said slots adapted to receive said pin of the associated slider.

8. A device according to claim 7, wherein said stationary bracket has in its slideway a pair of slots provided on each side thereof and offset in height to each other and each of said sliders has a pin of lesser length than the pin adapted to engage the radially extending slots of said movable bracket, the two pins of each slider being adapted to be received into said slots of said slideway of said stationary bracket in order to guide the movement of said sliders within said slideway.

* * * * *